Sept. 22, 1970 G. J. PRUSHA 3,530,395

DIFFERENTIAL AMPLIFIER SYSTEM

Filed Dec. 29, 1967 3 Sheets-Sheet 1

INVENTOR.
George J. Prusha

BY

Baldwin, Doran & Egan
ATTORNEYS

INVENTOR.
George J. Prusha
BY
Baldwin, Doran & Egan
ATTORNEYS

INVENTOR.
George J. Prusha
BY
Baldwin, Doran & Egan
ATTORNEYS

United States Patent Office
3,530,395
Patented Sept. 22, 1970

3,530,395

DIFFERENTIAL AMPLIFIER SYSTEM

George J. Prusha, 23201 Lincolnshire Drive,
Bay Village, Ohio 44140

Filed Dec. 29, 1967, Ser. No. 694,565
Int. Cl. H03f 3/68, 21/00
U.S. Cl. 330—69 6 Claims

ABSTRACT OF THE DISCLOSURE

A differential direct current amplifier system capable of detecting and amplifying low level signals in the presence of extremely large interfering common mode signals. The amplifier has differential input terminals to which is operatively connected a passive differential input divider circuit. The divider circuit consists of passive elements connected in a parallel or branch configuration and includes impedance elements in each branch operable to attenuate the direct current and alternating current components of the common mode signals. The impedance elements are adjustable so that the common mode signals may be directed to each branch of the divider circuit in any preselected ratio of division. The amplifier system also includes a preamplifier connected to the input of the divider circuit and to which the low level signals are applied and amplified, the common mode interference signal being connected to the input of the divider circuit bypassing the preamplifier.

This invention relates to amplifiers, and more particularly to direct coupled, differential, DC amplifiers, which detect and amplify low level signals in the presence of extremely large interfering common mode signals.

A typical low level system contains a sensitive transducer or signal source, an amplifier and a read-out mechanism. The signal sources excited from external voltage supplies, as in the case of bridge transducers, or they can produce self generating signals as from thermocouple and various bio-medical transducers. Most if not all installations to which this invention is applicable are subject to various forms and degrees of interfering signals, usually applied between the output reference and differential inputs. This type of signal is termed "common mode" and attempts are made to reduce, or eliminate, its affects by various methods. Other forms of interfering signals manifest themselves coincident with desired signal in the differential mode and cannot be distinguished from the wanted information. However, filter techniques permit reductions of this form of interference provided the spectrum of the two signals are adequately separated. Shielding techniques are another method to reduce the differential interfering signal. The ideal condition locates the signal source and associated amplifier within common shield, grounded at one single point.

Inadequate ground connections, the presence of known and unknown electromagnetic phenomena, proximity of power generating equipment and long signal cable lengths makes the reduction, or elimination of the common mode interfering signals most often more difficulit. It is therefore, necessary to incorporate some means of rejecting the common mode signal within the amplifier itself. The figure of merit of an amplifier of the type discussed herein is its ability to reject and tolerate large magnitudes of common mode signals. Another factor of importance is the maximum common mode level which can be tolerated before damage occurs to the amplifier circuitry.

Previous schemes of providing an amplifier suitable for low level detection in the presence of common mode environments have utilized either solid state or mechanical chopper devices, operating with an isolation transformer. Although the simplier chopper amplifier can tolerate high common mode voltages, and provides a reasonable degree of common mode rejection with sufficiently low drift rates, it has a limited bandwidth, produces chopper intermodulation, hash and spikes, exhibits higher noise per cycle of bandwidth and is relatively unreliable.

The current state-of-the-art of providing an amplifier suitable for detection of low level signals in the presence of high common mode environments employs a modulator-demodulator scheme. This technique relies on an isolation transformer to achieve a high common mode tolerance of on-the-order of ±250 volts and common mode rejection of 120 db with a 1K ohm source unbalance. The modulator-demodulator technique, operates from a high frequency multivibrator-oscillator, which permits much wider bandwidths than possible with a simplier chopper amplifier design. Chopper stabilization provides low drift rates, but in combination with the modulator circuitry produces intermodulation, hash and spikes, is relatively complicated and although exhibiting an extended bandwidth is limited to a frequency response between 10 and 20 kHz.

Equally prominent in today's state-of-the-art amplifiers of this type, utilize direct coupling techniques throughout. This design permits an order of magnitude, wider bandwidths, produces lower noise, has no chopper intermodulation and is simplier to make. However, the disadvantage of the direct-coupled amplifier is its relatively low tolerance to common mode voltage and slightly poor common mode rejection. The common mode voltage tolerance is limited by the power supply voltages within the amplifier, which usually places the common mode limit between ±10 and ±20 volts.

Accordingly, it is the object of this invention to provide an amplifier which is completely direct-coupled and will operate with a common mode voltage of up to ±600 volts DC or peak AC, and exhibit a common mode rejection of at least 120 db with a 1K source unbalance. This amplifier will simultaneously provide high quality characteristics comparable to the accuracies, stabilities and the like exhibited by the better modulator-demodulator technique described above.

It is another object of this invention to provide an amplifier, which will operate at a common mode voltage of up to ±600 volts and produce a bandwidth of at least 100 kHz. or one order greater than available with the modulator-demodulator type of amplifier.

Another object of this invention is to provide an amplifier, which will operate with a common mode voltage up to ±600 volts with a noise equivalent to the direct coupled configuration, which is completely free from chopper intermodulation hash and spikes and exhibits lower noise per bandwidth cycle than the modulator-demodulator type.

Still another object of this invention is to provide an amplifier, which is more simplier, more reliable than the amplifier incorporating the modulator-demodulator technique.

Another objective of this invention is to provide a means to extend the allowable common mode voltages to ±2000 without damage to the instrument or significant degradation in specifications.

GENERAL DESCRIPTION

An amplifier which operates in accordance with the objective of this invention contains a passive differential input divider, means for attenuating the interfering common mode signal and a differential operational amplifier means, which is connected to the input divider means for amplifying the desired differential signal.

More specifically, differential and common mode signals applied simultaneously to the input of the differential divider means are affected in a manner which attenuates the interfering common mode signal while the differential signal is amplified. This configuration is considered as an active isolator, which isolates the input from the output through the differential divider means and passes the desired differential signal to the output without affecting the information content. The differential input divider is also a part of the differential operational amplifier gain determining elements operating in conjunction with the feedback elements.

Another way to describe the circuit of this invention is to consider a differential operational amplifier with a controlled and deliberate amount of input shunt resistance across the operational amplifier input terminals.

This concept is extended to provide an overall system, which is advantageous in detecting low level signals in high common mode environments by applying the desired differential signal through an independently energized pre-amplifier, and the interfering common mode signal essentially directly to the differential input divider. The common mode signals bypass the pre-amplifier, are attenuated by the differential divider means and are further rejected by the action of the differential operational amplifier, while the desired differential signals are pre-amplified by the pre-amplifier means and applied to the differential divider-operational amplifier combination, where they are subsequently amplified, yielding a relatively high desired to undesired signal ratio. The degree of common mode signal rejection by the differential operational amplifier is highly dependent upon the resistive and reactive balance between the two input legs of the differential input divider and requires that variable adjustments for both impedance types be provided.

The objects of the present invention will become apparent from the fololwing description related to the attached drawings used to describe this invention. These are typical examples which shall not be considered as a limitation upon the scope of the present invention as defined in the appendent claims.

It should be noted that since the common mode attenuation is accomplished with a completely passive circuit, the tolerance to common mode levels discussed herein is unaffected whether or not the instrument is energized.

Figure 1:
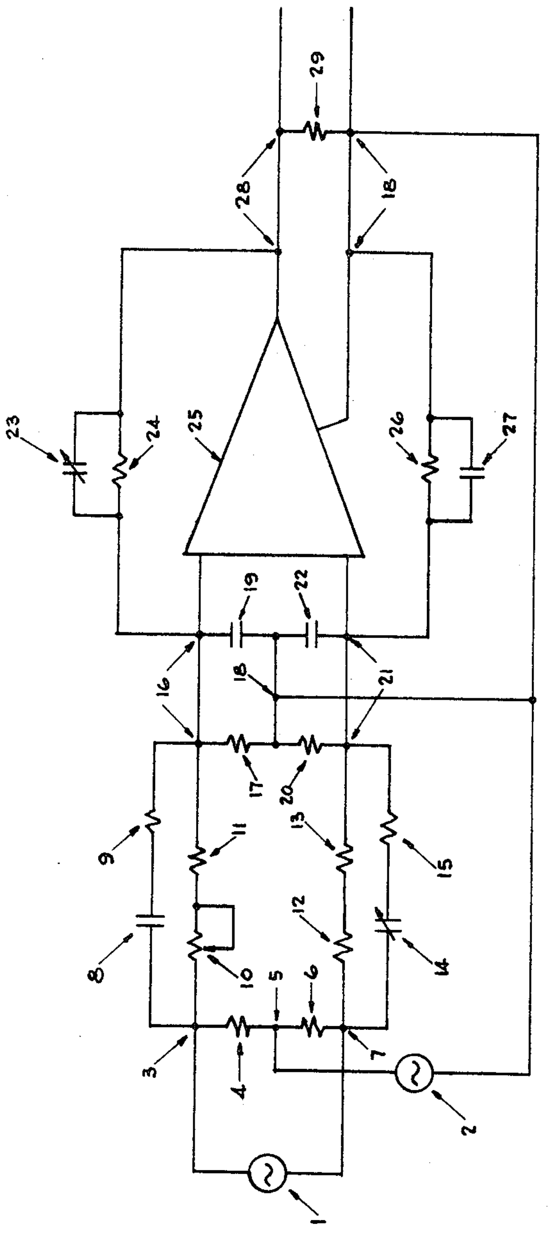
FIG. 1 is a schematic diagram of an amplifier of the present invention and shows the desired differential and the interfering common mode signal generators and their connections to the input circuitry of the differential operational amplifier.

Referring specifically to FIG. 1, the desired differential signal is represented by generator 1, attached to the amplifier input terminals, nodes 3 and 7. The interfering common mode signal is represented by generator number 2 and is applied across the amplifier input at node 5 and amplifier output common node 18. Both signals are fed simultaneously to the differential amplifier 25 through the differential input divider consisting of resistor elements 4, 6, 10, 11, 12, 13, 17 and 20. The input differential divider resistor elements 4, 10, 11 and 17, associated with the differential amplifier 25 input node 16 is made essentially equal to the conjugate resistor network comprising elements 6, 12, 13 and 20 applied to the differential amplifier 25 input node 21. Since this represents an evenly distributed current return path for the common mode signal generator, 2, the resultant voltage developed across resistor elements 17 and 20 will be essentially equal and of the same phase. The differential amplifier 25 is designed to provide reasonable common mode rejection and will therefore sense and amplify the resultant differential signals across its input nodes 16 and 21. By adjusting resistance element 10, the DC component of the common mode signal can be greatly reduced or completely eliminated from across the amplifier 25 output terminals 28 and 18. A variable capacitor trimmer, 14, is used to balance the AC components of the common mode signal with a fixed capacitor 8, thereby greatly reducing or eliminating both the DC and AC affects of the common mode signal up to reasonable frequencies.

Figure 3:
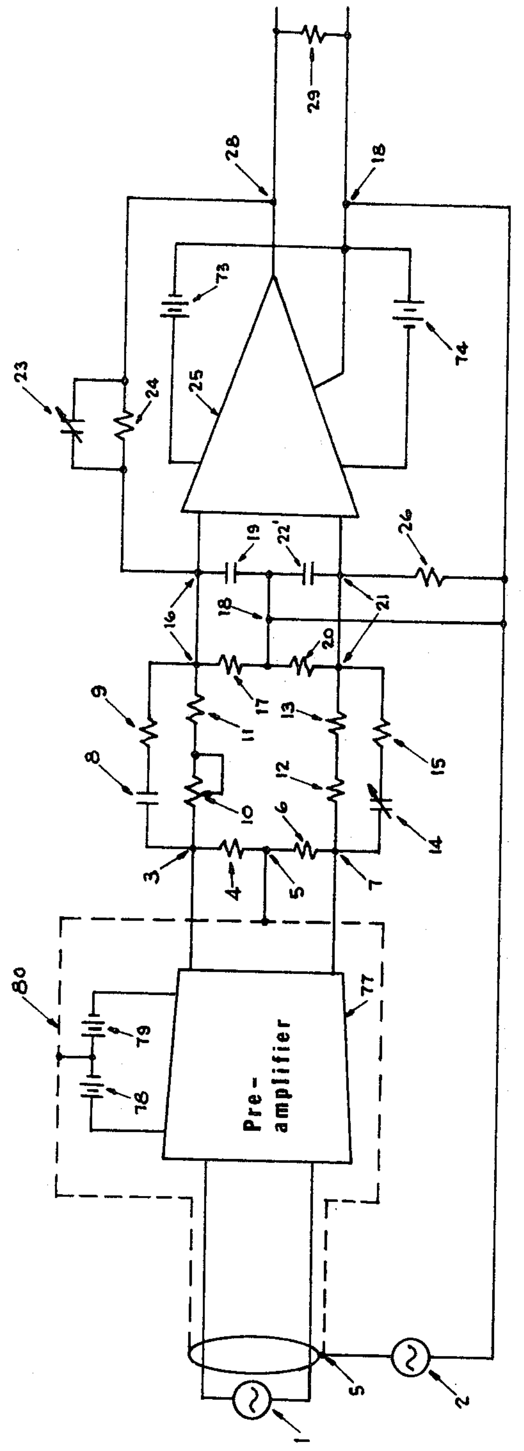
FIG. 3 is a schematic diagram of an amplifier system of the present invention and which combines an independently energized pre-amplifier with the common mode signal rejection circuit of FIG. 1 and relocates the desired, differential and common mode signal mode generates.

The amount of attenuation of the common mode signal is determined by the ratio of resistor elements 17 and 20 to the total resistance around the loop between nodes 5 and 18 through the respective input legs. A reasonable attenuation factor of 100 results in a common mode signal applied to the amplifier input of ±10 volts with a ±1000 volt common mode signal. The practical limitation on the maximum allowable common mode signal, consistant with this invention is the voltage limitation imposed by the series elements of the divider, the maximum common mode voltage which can be applied to the differential amplifier without overload, the resultant affect of voltage developed across resistor elements 4 and 6 on the associated pre-amplifier when combined as shown in FIG. 3, and the dielectric breakdown of materials in the current path across the common mode generator between nodes 5 and 18. By constructing a series string of components with lesser breakdown voltage limits, reducing the resistance, the values of 17 and 20 or increasing the common mode voltage breakkdown tolerance of the differential amplifier 25, reducing the values of resistance elements 4 and 6 or increasing the output bias currents of the pre-amplifier in FIG. 3 and employing suitable dielectric materials with sufficient space between conductors, a reasonable common mode tolerance of ±2000 volts may be achieved. A total series resistance arm made from four 500K ohm resistors each with a maximum allowable contious voltage of 750 v. with a shunt arm resistance of 10K ohms and a differential amplifier that operated with up to ±10 volts of common mode voltage provides an amplifier consistant with this invention, which operates with a common mode voltage of up to ±2000 volts. Attentuation of high frequency common mode signals is further enhanced with capacitive elements 19 and 22 placed in shunt across the differential amplifier 25 input terminals to the common mode 18. The desired differential amplifier operation conforms to standard theories when the input shunt resistors 17 and 20 are taken into account. Feedback is accomplished through resistive elements 24 and 26 in order to establish the desired operational amplifier gain.

The wideband frequency response is controlled by the resistance and capacitive elements 8, 9, 14, 15, 23, 24, 26 and 27. The variable capacitor 23 is used to adjust the fidelity of an input step function and resistive elements 9 and 15, in series with capacitors 8 and 14 provide pole frequencies to determine the overall wideband cutoff points. When sufficient open loop gains are employed in the differential amplifier 25, the affects of input shunt resistance 17 and 20 offer a negligible affect on the overall linearity, stability and accuracy of the amplifier system.

Figure 2:
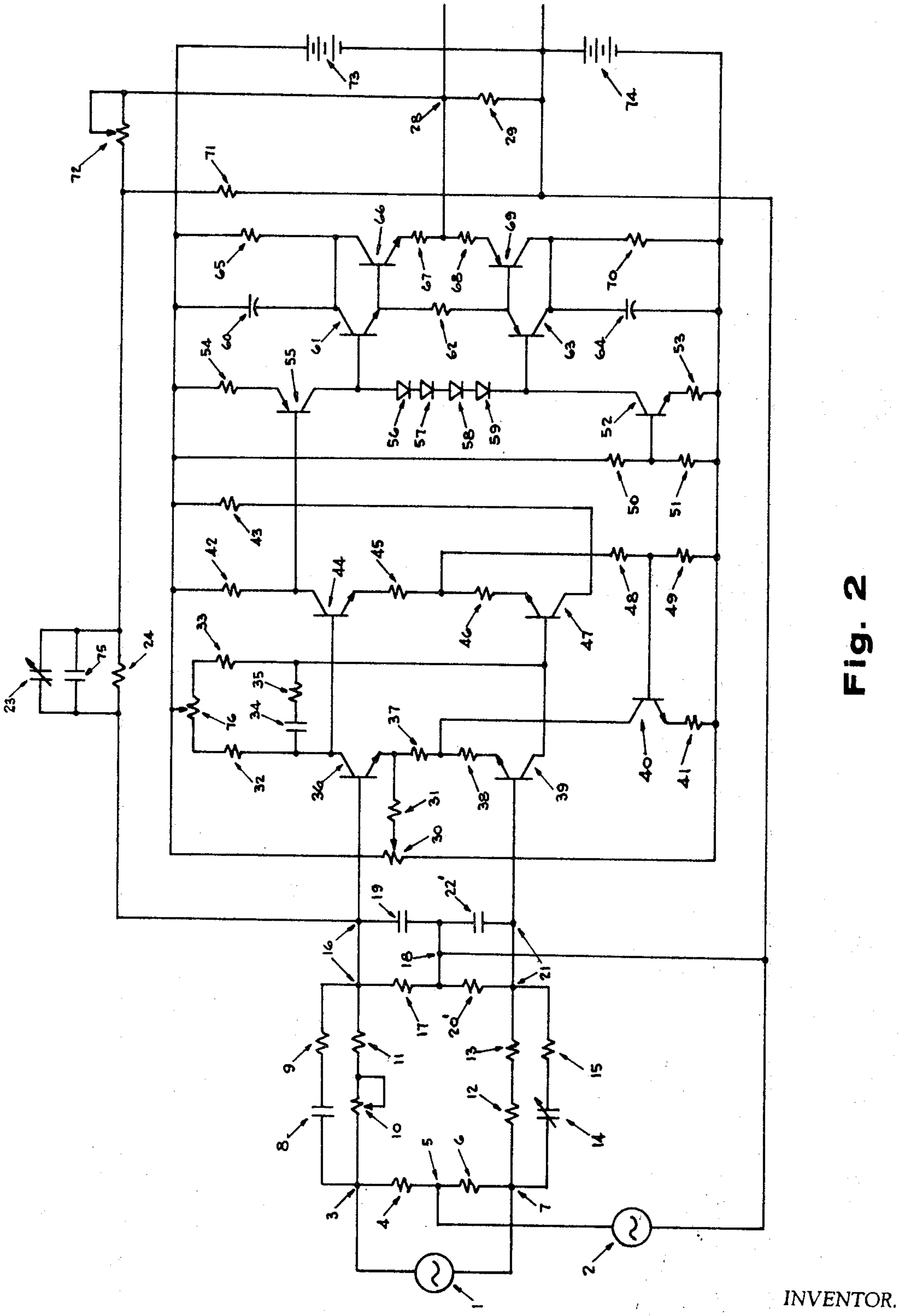
FIG. 2 is a detailed circuit diagram of the amplifier of FIG. 1 with a typical operational amplifier.

Referring to FIG. 2, the differential amplifier 25 consists of five stages of differential amplification with one common mode feedback amplifier connected between the first and second differential pairs. All elements and points common between FIGS. 1 and 2 retain the same nomenclature for simplicity. The input differential pair consists of transistors 36 and 39 each having a collector, an emitter and a base. The input terminal 16 is connected to the base of transistor 36 and the input terminal 21 to the base of transistor 39. The emitters are interconnected through fixed resistors 37 and 38, whose common point is connected to the collector of transistor 40. The collector of transistor 36 is connected to resistor 32 to a variable resistance 76 and the collector of transistor 39 is connected to a resistor 33 to the opposite end of variable resistor 76. The movable arm of variable resistance 76, connected to the positive supply voltage from battery 73 is used by adjusting the temperature coefficient of the differential amplifier. The second stage consists of a pair of transistors, 44 and 47, each have a collector, an emitter and a base. The signal from the collector of transistor 36 is applied to the base of transistor 44, while the signal from the collector of transistor 39 is applied to the base of transistor 47. The emitters are interconnected through resistors 45 and 46, whose common point is connected to resistor 48 in the base divider network for transistor 40. A portion of a common mode signal at the junction of resistor 45 and 46 is applied to the base of transistor 40 across resistance element 49. The phase of the connections of the first and second differential pair with the common mode constant current feedback stage utilizing transistor 40 is properly arranged to minimize the common mode signal affects impressed upon the input differential transistor pair 36 and 39. The emitter of transistor 40 is connected to a resistance element 41 to the negative potential from battery 74 to establish circuit continuity and bias stabilization. The collector of transistor 44 is connected to resistor 42 to the positive potential from battery 73, and the collector of transistor 47 is connected through resistor 43 to the battery potential of 73. The third stage consists of transistor 55 having a collector, base and emitter. The signal occurring at the collector of transistor 44 is connected to the base of transistor 55, whose emitter is connected through resistor 54 to the positive potential from battery 73.

The collector circuit consists of a string of four forward diodes 56, 57, 58 and 59 and the constant current generator comprised of transistor 52, having a collector, base and emitter. The base of transistor 52 is biased from the divider network of resistors 52 and 51 and the emitter is connected to the negative potential of battery 74 through resistor 53 for circuit continuity and stabilization. The final stage of the amplifier consists of a complementary Darlington pair comprising transistors 61, 63, 66 and 69, each having a collector, base and emitter. The base of transistor 61 is connected directly to the collector of transistor 55 and the base of transistor 63 is connected to the junction of the cathode of diode 59 and the collector of the transistor 52. The collectors of transistors 61 and 63 are connected to the collector of transistors 66 and 69, while their emitters are connected to the bases of 66 and 69 respectively. A resistor 62 is also connected between the emitters of 61 and 63 to provide a bias current path for proper class AB operation. The emitters of transistors 66 and 69 are interconnected through resistors 67 and 68, whose common point is attached to the output terminals of the amplifier and the feedback return path at node 28. The collector of transistor 66 is applied to the positive battery 73 through resistor 65 and capacitor 60. The collector of transistor 69 is connected to the negative potential of battery 74 through resistor 70 and capacitor 64. Variable gain control is accomplished with the feedback divider network of resistor 71 and the variable resistor 72.

Operation of the circuits illustrated in FIGS. 1 and 2 is best described by analysing the differential and common mode signals independently. The desired differential signal analysis will be presented first by considering a signal generator 1 applied across the amplifier input terminals 3 and 7, such that current flowing into node 3 equals the current flowing through elements 4, 10 and 8 and being equal to the currents from elements 6, 12 and 14 summing to equal the current from node 7. The currents through elements 8 and 10 sum at node 16 and equal the total of current through elements 17, 19, 23 and 24 and the base of transistor 36, and the currents through elements 20, 22, 26, 27 and the base of transistor 39. The input differential circulating transistor currents through transistors 36 and 39 creates and amplified current flow in the collector circuit consisting of resistors 32, 33 and 76 and the base circuit of transistors 44 and 47. The differential currents through the base electrodes of 44 and 47 generates a corresponding collector current flow through their collector resistors 42 and 43 and the base to emitter of transistor 55. Transistor 55, in turn generates a current flow through its collector and emitter circuit into the bases of the complementary Darlington output stage and the collector circuit of the constant current generator, transistor 52. The input signal currents into transistor 61 and 63 develop corresponding emitter currents, which circulate through resistor 62 and the final transistor complementary pair base circuits of transistors 66 and 69. The direction of output current and feedback current flow through resistor 72 and 24 is dependent upon the polarity of signal, which causes either the PNP or NPN portion of the Darlington pair to conduct. It should be noted that resistors 20 and 26, in FIG. 1 are replaced with an equivalent value in FIG. 2 at location 20′ and the capacitive elements of 22 and 27 are combined into 22′ since both elements are returned to common mode at node 18.

The common mode current operation relies on the ability of the differential input divider to present equal voltages to the input of the differential amplifier 25 across nodes 16 and 21 to 18 and the subsequent inability of the differential amplifier 25 to produce an output when the two common mode input voltages are equal. Consider a signal generator 2 applied across nodes 5 and 18 of the differential input divider-amplifier combination, such that current flowing through element 4 approximately equals the current through element 6 and both are in the same direction with respect to the generator output current. These currents are established primarily by the amount of applied common mode voltage and the value of the series arm resistance 10 and 11 associated with the current through 4 and resistance 12 and 13 associated with the current through element 6, since the series resistance is made much larger than all other resistances across the common mode generator 2. The total resistance of elements 10 and 11 is made approximately equal to the total resistance of 12 and 13, which causes the two common mode currents, dividing at node 5 to be approximately equal and in the same direction through the node 5 to 18 loop. This developes essentially equal voltages across the matched elements 17 and 20 at nodes 16 and 21. Since elements 17 and 20 are some fraction resistance of the total loop resistances, the voltages across these respective resistors will be some fraction of the applied common mode voltage. By adjusting the variable resistance 10, the divided common mode input current can be controlled to develop exactly equal voltages across resistance elements 17 and 20 at DC and lower frequencies and by adjusting the variable capacitor 14, the alternating current component of the common mode signal can be made to develop equal voltages across the input to the differential amplifier. The two equal portions of the applied common mode voltage are presented to their respective inputs of the differential amplifier at nodes 16 and 21, which are attached to the respective bases of transistors 36 and 39. These voltages cause essentially equal currents to flow in the same phase with respect from collector to emitter or conversely emitter to collector in the collector circuits of transistors 36 and 39, developing equal voltages across essentially equal resistors 32 and 33, resulting in an essentially equal amount of base current in the same phase through the bases of transistors 44 and 47. These currents are amplified and summed through element 48 to supply a negative feedback error signal current to the base of transistor 40, which in turn supplies current of opposite phase to that flowing from the impressed common mode signal to the emitter circuits of transistors 36 and 39. This results in an essentially constant current through collector circuits of transistors 36 and 39 for all levels of impressed common mode signal until overload occurs. Unbalances in the circuitry associated with the input transistor pair 36 and 39, or the second differential pair 44 and 47 are compensated for by adjusting the variable resistance element 10 or variable capacitor element 14 to greatly reduce or eliminate all affects of the applied common mode voltage from the differential amplifier 25 output at node 28. With a properly adjusted differential input divider network, the resultant common mode currents in the collector circuit of transistor 44 are made to approach zero and have no affect on the static bias currents of transistor 55. With no change in current through the collector circuit of transistor 55 no change in amplifier output current will be experienced, accomplishing the desired affect from applied input common mode signals.

The block diagram and circuit illustrated in FIG. 3 show a complete amplifier system utilizing the basic principles described above. This arrangement introduces a separately energized precision pre-amplifier 77 of conventional design between the differential signal source and the differential input divider nodes 3 and 7. The common mode signal source remains connected to the common mode input terminal 5 through the signal input cable shield and pre-amplifier 77 enclosure 80. The precision pre-amplifier 77 is energized from independent batteries 78 and 79. The junction of battery 78 and 79 is connected to the pre-amplifier enclosure 80 in order to drive the pre-amplifier circuitry at the common mode voltage, minimizing the affects and influence of the common mode signal on the pre-amplifier circuitry.

The connection in FIG. 3 permits an overall amplifier, which exhibits characteristics of high input impedance, high gain, low drift, wide bandwidth, high linearity and other characteristics necessary for accurate low level amplification. It should be noted that the overall common mode rejection figure is improved in direct proportion to the amount of gain produced by the precision pre-amplifier number 77. With an amplifier voltage gain of 1000 and an operational amplifier-differential input divider network, common mode rejection of 90 db, the overall common mode rejection figure would become 150 db. The configuration of FIG. 3 is practical, since a typical installation in either the data acquisitioning or medical application would consider the common mode signal generator applied to the input signal shield at node 5 as illustrated. A further ramification of this illustration, would include a shield around the differential source and also tied to input shield at node 5. The signal phases for the entire amplifier system are arranged to provide inverting or non-inverting outputs depending upon the connections made at the input with respect to output reference node 18.

Performance of the complete amplifier system illustrated in FIG. 3, yields an instrument which provides voltage gains from 1 through 2500, a linearity of .01% an input impedance of 50 megohms at all gains, an output of ±10 v. @ 100 ma., a drift of 1 μv./° C. with a common mode overload voltage of ±600 v. DC or peak AC a common mode rejection of better than 120 db with a 1K source unbalance and a noise of 12 μv. peak to peak P—P referred to input without chopper intermodulation hash or spikes. Experimental work has verified the ±2000 common mode voltage tolerance presented in the text of this invention.

On characteristic which may be considered a limitation to some users, although not a practical deterrent, is the finite, but high impedance value of the common mode input circuit. Commercially available components permit impedances on the order of 10 megohms at lower frequencies. This characteristic may be alleviated with field affect transistor (FET) connected in a common drain configuration, supplied from the common mode amplifier power supply. The input impedance observed with this circuit is on the order of 1000 magohms. However, the common mode voltage tolerance is then limited to the gate to drain breakdown voltage and the amount of power supply voltage available. Commercially available FET units can tolerate up to 400 volts gate to drain breakdown voltage. When powered from a high voltage, but low current power supply, all the characteristics discussed previously can be approached with thousands of megohms input impedance's measured on all input terminals with respect to each other and output.

The terms and expressions which have been used are used as terms of description and not of limitation and there is no intention in the use of such terms and expressions of excluding any equivalents of any of the features shown or described or portions thereof, and it is recognized that various modifications are possible within the scope of the invention claimed.

Typical component values for all embodiments herein disclosed may be as follows:

Resistors 4 and 6—10K ohms.
Resistor 10—10K ohm.
Resistor 12—4.7K ohm.
Resistors 11 and 13—2 megohms.
Resistors 9 and 15—27K ohms.
Resistors 17 and 20—20K ohms.
Resistors 32 and 33—51K ohms.
Resistors 37 and 38—100 ohms.
Resistor 35—1K ohms.
Resistor 41—2K ohms.
Resistors 45 and 46—100 ohms.
Resistors 42 and 43—5.1K.
Resistor 48—100K.
Resistor 49—8.2K.
Resistor 50—120K.
Resistor 51—5.1K.
Resistor 53—100 ohms.
Resistor 54—62 ohms.
Resistor 62—12K ohms.
Resistors 65 and 70—50 ohms.
Resistors 67 and 68—10 ohms.
Resistor 71—10K ohms.
Resistor 72—20K ohms.
Resistor 24—1 megohms.
Capacitor 8—30 pf.
Capacitor 14—27 to 40 pf.
Capacitors 19 and 22—120 pf.
Capacitor 23—3 to 12 pf.
Capacitor 75—56 pf.
Capacitor 34—500 pf.
Capacitors 60 and 64—2 mfd.
Transistors 36 and 39—SA 2312 differential pair.
Transistors 40, 44, 47, 61 and 52—2 N 3569.
Transistors 55 and 63—2 N 3645.
Transistor 66—2 N 2102.
Transistor 69—2 N 4036.

What is claimed is:

1. An amplifier for providing amplification to a differential signal while effecting common mode signal rejection comprising, a direct coupled multiple-stage differential amplifier having input terminal means, a passive differential input divider circuit operatively connected to said amplifier input terminal means, said divider circuit having differential input terminal means to which differential signals are applied, said divider circuit including a plurality of branch circuits each having a plurality of passive impedance elements, said branch circuits being connected in parallel between the differential input terminal means and the amplifier input terminal means to define at least a pair of signal paths therebetween, means for connecting the common mode signals between said differential input terminal means and the amplifier input terminal means, and at least one of said impedance elements being adjustable to vary the direct current component of said common mode signal and a second of said impedance elements being adjustable to vary the alternating current component of said common mode signal.

2. An amplifier as is defined in claim 1 and wherein the one impedance means comprises variable resistance means.

3. An amplifier as is defined in claim 1 and wherein the second impedance means comprises variable capacitance means.

4. An amplifier system as is defined in claim 1 and wherein a differential pre-amplifier has its output operatively connected to the differential input terminal means of said divider circuit, and said differential pre-amplifier having means for shielding the pre-amplifier from extraneous external signals.

5. An amplifier system as is defined in claim 4 and wherein the shield means is operatively connected between the differential input terminal means of said differential amplifier.

6. An amplifier system as defined in claim 5, and wherein means are provided for coupling the common mode signal between the shield means and the differential amplifier input terminal means.

References Cited

UNITED STATES PATENTS

| | | | |
|---|---|---|---|
| 3,219,943 | 11/1965 | Gogia et al. | 330—69 |
| 3,271,692 | 9/1966 | Kalbfell | 330—69 |
| 3,275,945 | 9/1966 | Walker et al. | 330—30 |
| 3,370,242 | 2/1968 | Offner | 330—69 X |

NATHAN KAUFMAN, Primary Examiner

U.S. Cl. X.R.

330—30, 185